United States Patent [19]

Nintz et al.

[11] Patent Number: 5,084,484
[45] Date of Patent: Jan. 28, 1992

[54] PREPARATION OF FOAMS HAVING HIGH HEAT-DISTORTION RESISTANCE, AND FOAMS BASED ON AROMATIC POLYETHER KETONES

[75] Inventors: Eckhard Nintz, Ludwigshafen; Heinz Weber, Gruenstadt; Wilhelm Nickolaus, Ludwigshafen, all of Fed. Rep. of Germany

[73] Assignee: BASF Aktiengesellschaft, Ludwigshafen, Fed. Rep. of Germany

[21] Appl. No.: 534,272

[22] Filed: Jun. 7, 1990

[30] Foreign Application Priority Data

Jun. 7, 1989 [DE] Fed. Rep. of Germany ....... 3918583

[51] Int. Cl.$^5$ .............................................. C08J 9/14
[52] U.S. Cl. ..................................... 521/97; 521/182; 521/189
[58] Field of Search ................... 521/97, 182, 138, 189

[56] References Cited

U.S. PATENT DOCUMENTS

| | | | |
|---|---|---|---|
| 3,277,029 | 10/1966 | Chadwick et al. | 521/97 |
| 4,588,754 | 5/1986 | Liu | 521/92 |
| 4,810,570 | 3/1989 | Rutteu et al. | 521/143 |
| 4,943,594 | 7/1990 | Ezawa et al. | 521/180 |
| 4,978,692 | 12/1990 | Ezawa et al. | 521/189 |

FOREIGN PATENT DOCUMENTS

| | | |
|---|---|---|
| 0149191 | 7/1985 | European Pat. Off. . |
| 1808708 | 11/1968 | Fed. Rep. of Germany . |
| 50-041964 | 4/1975 | Japan . |
| 63-264644 | 11/1988 | Japan . |
| 1226340 | 3/1971 | United Kingdom . |

*Primary Examiner*—Morton Foelak
*Attorney, Agent, or Firm*—Oblon, Spivak, McClelland, Maier & Neustadt

[57] ABSTRACT

Foams of density 0.1 to 1.0 g/cm$^3$ based on aromatic polyether ketones and other thermoplastic polymers having a high melting point are obtained by melting an intimate mixture of the polymer and from 0.5 to 10% by weight of an aliphatic or aromatic dicarboxylic acid or polycarboxylic acid which suffers a weight loss of 50% or more with elimination of gaseous decomposition products on heating to from 130 to 300° C., and simultaneously cooling and molding the melt.

2 Claims, No Drawings

PREPARATION OF FOAMS HAVING HIGH HEAT-DISTORTION RESISTANCE, AND FOAMS BASED ON AROMATIC POLYETHER KETONES

The present invention relates to the preparation of foams based on thermoplastics having high heat-distortion resistance using dicarboxylic acids and polycarboxylic acids as chemical blowing agent. The invention furthermore relates to foams based on aromatic polyether ketones.

Foams based on aromatic polyether ketones were hitherto not known. Attempts to prepare foams using customary known physical or chemical blowing agents comprising aromatic polyether ketones fail due to the unsatisfactory solubility of the blowing agents and the high softening point of these polymers.

It is an object of the present invention to prepare these hitherto unknown foams based on aromatic polyether ketones. It is a further object of the invention to find novel chemical blowing agents for the preparation of foams having a homogeneous cell structure based on high temperature-resistant thermoplastics.

We have found that these objects are achieved by the use of chemical blowing agents based on dicarboxylic acids and polycarboxylic acids which suffer a weight loss of 50% or more with elimination of gaseous decomposition products on heating to from 150° to 300° C.

The present invention thus relates to a process for the preparation of foams having high heat-distortion resistance, which comprises melting an intimate mixture of
a) a thermoplastic polymer having a softening point (melting point) of above 200° C., and
b) from 0.5 to 10% by weight, relative to a), of an aliphatic or aromatic dicarboxylic acid or polycarboxylic acid which suffers a weight loss of 50% or more with elimination of gaseous decomposition products on heating to from 130° to 300° C.,
and simultaneously cooling and molding the melt.

The invention furthermore relates to foams of density from 0.1 to 1.0 g/cm³ based on aromatic polyether ketones.

It was known to use a mixture of sodium bicarbonate and organic acids as blowing agent for the preparation of foams comprising thermoplastics. Sodium bicarbonate reacts with organic acids with formation of carbon dioxide even at low temperatures. The process is therefore unsuitable for the preparation of foams comprising high-melting-point thermoplastics.

A skilled worker would find it surprising that labile organic dicarboxylic acids and polycarboxylic acids can be converted, even using thermoplastics of this type, into foams which have a significantly higher melting point than the decomposition point of the blowing agent, and that the mechanical properties of the foams are not impaired by the decomposition products of the blowing agent.

Suitable starting materials for the novel process are all thermoplastic polymers having a softening point (melting point) of above 200° C., preferably from 230° to 450° C., in particular from 260° to 420° C., such as aliphatic, aromatic and partially aromatic polyamides, polyesters based on aromatic dicarboxylic acids, in particular terephthalic acid, and aliphatic diols having from 2 to 6 carbon atoms, and/or bisphenols, aromatic polysulfones and polyether sulfones, aromatic polyethers and polysulfides, such as poly-3,5-dimethylphenylene oxide and polyphenylene sulfide, and aromatic polyether ketones, such as PEK, PEKK, PEKEKK and PEEK.

The chemical blowing agents used in the context of the invention are aliphatic or aromatic dicarboxylic acids or polycarboxylic acids which suffer a weight loss of 50% by weight or more with elimination of gaseous decomposition products on heating to from 130° to 300° C. Whether a compound is suitable can easily be determined by a test in which a sample is heated under nitrogen at a heating rate of 4° C. per minute, and the temperature at which a weight loss of 50% has occurred (=decomposition temperature D) is determined. Examples of suitable compounds are aliphatic dicarboxylic acids having from 2 to 8 carbon atoms, which may contain a hydroxyl or keto group, such as oxalic acid (D=182° C.), malonic acid (D =252° C.), adipic acid (D=245° C.), pimelic acid (D=252° C.) and acetonedicarboxylic acid (D=135° C.). A suitable aromatic polycarboxylic acid is, in particular, pyromellitic acid (D=275° C.).

The carboxylic acid is generally used in amounts of from 0.5 to 10% by weight, preferably from 0.8 to 8% by weight, in particular from 1 to 6% by weight, relative to the thermoplastic. The density of the foam can be adjusted by varying the amount of blowing agent and the degree of filling of the mold.

The foam is prepared by melting an intimate mixture of thermoplastic and blowing agent, and simultaneously cooling and molding the melt. For example, a possible procedure is to introduce into a sealed mold an amount of this mixture calculated in accordance with the desired density, and to heat the mold to the melting point, it being expedient to ensure, through tiny openings in the mold, that air expelled during foaming can escape from the mold. After cooling, the foam molding can be removed from the mold.

However, another possible procedure is to melt the thermoplastic/blowing agent mixture in an extruder under pressure and decompress the melt in a molding channel to produce foam sheets.

The foams obtained generally have a density of from 0.1 to 1.0 g/cm³, preferably from 0.1 to 0.8 g/cm³ in particular from 0.2 to 0.7 g/cm³.

Their heat-distortion resistance corresponds to the thermoplastics on which they are based. The foams are distinguished by a homogeneous cell structure having a mean cell diameter of from 0.03 to 1.2 mm, in particular from 0.2 to 0.8 mm.

The foams obtained are used as an insulation and building material in the interiors of motor vehicles, aircraft and spacecraft.

EXAMPLE 1

100 parts by weight of polyphenylene ether ketone, synthesized from structural units of the formula $-C_6H_4-O-C_6H_4-O-C_6H_4-CO-$ (PEEK) in finely divided form (particle size less than 0.3 mm), density 1.32 g/cm³, melting point about 340° C., were mixed intimately with 2 parts by weight of pyromellitic acid. 60 Parts by volume of the mixture are introduced into a closed metal mold which permits the escape of gases (mold volume 100 parts by volume). The mold is heated at 380° C. for 10 minutes in a muffle furnace and then cooled. A foam molding of density 0.75 g/cm³ and a mean cell size of 0.2 mm is obtained. The heat-distortion resistance is 260° C.

EXAMPLE 2

The procedure was as in Example 1, but 4 parts by weight of pyromellitic acid were used. 25 Parts by volume of the mixture were introduced into the mold. The foam obtained has a density of 0.32 g/cm$^3$ and a mean cell diameter of 0.4 mm.

EXAMPLE 3

The procedure was as in Example 1, but a mixture of 100 parts by weight of polyphenylene ether ketone, synthesized from structural units of the formula —$C_6H_4$—O—$C_6H_4$—CO—$C_6H_4$—O—$C_6H_4$—CO—$C_6H_4$—CO— (PEKEKK), density 1.31 g/cm$^3$, melting point about 375° C., and 4 parts by weight of pyromellitic acid was used. The mold was heated at 420° C. for 15 minutes The foam obtained has a density of 0.72 g/cm$^3$ and a mean cell diameter of 0.1 mm.

EXAMPLE 4

In corresponding manner to Example 3, using 4 parts by weight of pyromellitic acid and a degree of filling of the mold of 35%, a foam of density 0.42 g/cm$^3$ and a mean cell diameter of 0.3 mm was prepared.

EXAMPLE 5

100 parts by weight of a polyester based on terephthalic acid and hydroquinone (LC polymer) of density 1.39 g/cm$^3$ and melting point 260° C. were mixed with 3.6 parts by weight of anhydrous oxalic acid, and the mixture was foamed in a mold by heating at 330° C. for 15 minutes to give a molding of density 0.4 g/cm$^3$ or 1.0 g/cm$^3$, depending on the degree of filling. The mean cell size was 0.5 or 0.04 mm respectively.

EXAMPLE 6

100 parts by weight of a partly aromatic copolyamide, synthesized from caprolactam and terephthalic acid/hexamethylenediamine (weight ratio 30:70), density 1.2 g/cm$^3$, melting point 295° C., were mixed intimately with 1.5 parts by weight of oxalic acid, and the mixture was heated at 350° C. for 15 minutes in a mold (degree of filling 70%). The foam obtained has a density of 0.82 g/cm$^3$.

EXAMPLE 7

The procedure was as in Example 6, but 2.5 parts by weight of oxalic acid were used and the degree of filling of the mold was 35%. A foam of density 0.4 g/cm$^3$ was obtained.

We claim:

1. A process for the preparation of a foam having high heat-distortion resistance, which comprises melting an intimate mixture of
   (a) a thermoplastic polymer having a softening point (melting point) of above 200° C., selected from the group consisting of a polyamide, a polyester of an aromatic dicarboxylic acid, an aromatic polysulfone, a polyether sulfone and an aromatic polyether ketone, and
   (b) from 0.5 to 10% by weight, relative to (a), of an aliphatic or aromatic dicarboxylic acid or polycarboxylic acid which suffers a weight loss of 50% or more with elimination of gaseous decomposition products on heating to from 130° to 300° C.,
   and simultaneously cooling and molding the melt.

2. A process as claimed in claim 1, wherein component b) used is an aliphatic dicarboxylic acid having from 2 to 8 carbon atoms, which may contain a hydroxyl or keto group, or pyromellitic acid.

* * * * *